US009152969B2

(12) United States Patent
Borgs et al.

(10) Patent No.: US 9,152,969 B2
(45) Date of Patent: Oct. 6, 2015

(54) RECOMMENDATION RANKING SYSTEM WITH DISTRUST

(75) Inventors: Christian H. Borgs, Boston, MA (US); Jennifer T. Chayes, Boston, MA (US); Adam T. Kalai, Atlanta, GA (US); Azarakhsh Malekian, Chicago, IL (US); Moshe Tennenholtz, Haifa (IL)

(73) Assignee: Rovi Technologies Corporation, Santa Clara, CA (US)

( * ) Notice: Subject to any disclaimer, the term of this patent is extended or adjusted under 35 U.S.C. 154(b) by 1275 days.

(21) Appl. No.: 12/755,791

(22) Filed: Apr. 7, 2010

(65) Prior Publication Data

US 2011/0252121 A1 Oct. 13, 2011

(51) Int. Cl.
| | | |
|---|---|---|
| *G06F 15/173* | (2006.01) | |
| *H04W 24/00* | (2009.01) | |
| *G06F 7/04* | (2006.01) | |
| *G06Q 30/02* | (2012.01) | |
| *G06F 17/30* | (2006.01) | |
| *G06Q 10/10* | (2012.01) | |

(Continued)

(52) U.S. Cl.
CPC .......... *G06Q 30/02* (2013.01); *G06F 17/30867* (2013.01); *G06Q 10/10* (2013.01); *G06F 21/6245* (2013.01); *G06Q 30/00* (2013.01)

(58) Field of Classification Search
CPC ............. G06F 21/6245; G06Q 10/109; G06Q 10/1093; G06Q 30/02; G06Q 30/08; G06Q 50/01; H04L 9/321
USPC ............................................. 707/3; 709/223
See application file for complete search history.

(56) References Cited

U.S. PATENT DOCUMENTS

| | | | |
|---|---|---|---|
| 5,732,216 | A | 3/1998 | Logan et al. |
| 6,239,794 | B1 | 5/2001 | Yuen et al. |

(Continued)

FOREIGN PATENT DOCUMENTS

| | | |
|---|---|---|
| EP | 1841219 A2 | 10/2007 |
| JP | 2003/250146 A | 9/2003 |

(Continued)

OTHER PUBLICATIONS

Trust-Based Recommendation Systems: An Axiomatic Approach—Published Date: Apr. 21-25, 2008 http://www.eecs.harvard.edu/~michaelm/CS222/trust.pdf.

(Continued)

*Primary Examiner* — Arvin Eskandarnia
*Assistant Examiner* — Margishi Desai
(74) *Attorney, Agent, or Firm* — Ropes & Gray LLP

(57) ABSTRACT

A recommendation ranking system that computes trust for entities based on negative expressions of trust. Negative expressions of trust are used to reduce the trust of entities. However, the system may discount entities that in the aggregate are distrusted. The system may be used with a social network to provide accurate, personalized recommendations for members of the social network. The network may be modeled as a voting network, with each member of the social network represented as a node and expressions of trust between members represented as weights on edges between nodes. Values of trust may be computed for nodes in the network and used to generate a recommendation. Opinions expressed on a topic may be weighted by trust in the node expressing the opinion. The system may be applied in other settings that can be modeled as a voting network, including ranking of Internet search results.

20 Claims, 8 Drawing Sheets

(51) Int. Cl.
*G06Q 30/00* (2012.01)
*G06F 21/62* (2013.01)

(56) References Cited

U.S. PATENT DOCUMENTS

| | | | |
|---|---|---|---|
| 6,388,714 B1 | 5/2002 | Schein et al. | |
| 6,564,378 B1 | 5/2003 | Satterfield et al. | |
| 6,756,997 B1 | 6/2004 | Ward, III et al. | |
| 7,165,098 B1 | 1/2007 | Boyer et al. | |
| 7,185,335 B2 | 2/2007 | Hind et al. | |
| 7,451,470 B2 | 11/2008 | Zimmerman | |
| 7,680,882 B2 | 3/2010 | Tiu, Jr. et al. | |
| 7,756,895 B1 | 7/2010 | Emigh | |
| 7,904,924 B1 | 3/2011 | de Heer et al. | |
| 8,046,801 B2 | 10/2011 | Ellis et al. | |
| 8,107,397 B1* | 1/2012 | Bagchi et al. | 370/254 |
| 2002/0065802 A1 | 5/2002 | Uchiyama | |
| 2002/0140728 A1 | 10/2002 | Zimmerman | |
| 2002/0174430 A1 | 11/2002 | Ellis et al. | |
| 2003/0055894 A1* | 3/2003 | Yeager et al. | 709/204 |
| 2003/0110499 A1 | 6/2003 | Knudson et al. | |
| 2003/0144862 A1 | 7/2003 | Smith et al. | |
| 2003/0226146 A1 | 12/2003 | Thurston et al. | |
| 2004/0103434 A1 | 5/2004 | Ellis | |
| 2004/0231003 A1 | 11/2004 | Cooper et al. | |
| 2004/0260574 A1 | 12/2004 | Gross | |
| 2005/0060743 A1 | 3/2005 | Ohnuma et al. | |
| 2005/0097170 A1* | 5/2005 | Zhu et al. | 709/204 |
| 2005/0160458 A1 | 7/2005 | Baumgartner | |
| 2005/0204388 A1 | 9/2005 | Knudson et al. | |
| 2005/0251827 A1 | 11/2005 | Ellis et al. | |
| 2005/0262542 A1 | 11/2005 | DeWeese et al. | |
| 2005/0273812 A1 | 12/2005 | Sakai | |
| 2006/0010478 A1 | 1/2006 | White et al. | |
| 2006/0053449 A1 | 3/2006 | Gutta | |
| 2006/0150216 A1 | 7/2006 | Herz et al. | |
| 2006/0190966 A1 | 8/2006 | McKissick et al. | |
| 2006/0248573 A1 | 11/2006 | Pannu | |
| 2006/0271959 A1 | 11/2006 | Jacoby et al. | |
| 2007/0064626 A1* | 3/2007 | Evans | 370/254 |
| 2007/0121843 A1 | 5/2007 | Atazky | |
| 2007/0136745 A1 | 6/2007 | Garbow et al. | |
| 2007/0157242 A1 | 7/2007 | Cordray et al. | |
| 2007/0174249 A1* | 7/2007 | James | 707/3 |
| 2007/0186242 A1 | 8/2007 | Price et al. | |
| 2007/0199025 A1 | 8/2007 | Angiolillo et al. | |
| 2007/0208613 A1* | 9/2007 | Backer | 705/10 |
| 2007/0214162 A1 | 9/2007 | Rice | |
| 2007/0250866 A1 | 10/2007 | Yamada | |
| 2008/0016240 A1* | 1/2008 | Balandin | 709/238 |
| 2008/0255977 A1* | 10/2008 | Altberg et al. | 705/35 |
| 2008/0275719 A1* | 11/2008 | Davis et al. | 705/1 |
| 2008/0301732 A1 | 12/2008 | Archer et al. | |
| 2009/0112989 A1* | 4/2009 | Anderson et al. | 709/204 |
| 2009/0133070 A1 | 5/2009 | Hamano et al. | |
| 2009/0151002 A1* | 6/2009 | Zuniga et al. | 726/27 |
| 2009/0164263 A1 | 6/2009 | Marlow | |
| 2009/0271358 A1 | 10/2009 | Lindahl | |
| 2010/0030638 A1* | 2/2010 | Davis et al. | 705/14.43 |
| 2010/0306194 A1* | 12/2010 | Evans | 707/733 |
| 2011/0047213 A1* | 2/2011 | Manuel | 709/204 |
| 2011/0113249 A1* | 5/2011 | Gelbard et al. | 713/170 |
| 2011/0137789 A1* | 6/2011 | Kortina et al. | 705/38 |
| 2011/0179081 A1* | 7/2011 | Ovsjanikov et al. | 707/780 |
| 2011/0214148 A1 | 9/2011 | Gossweiler, III et al. | |
| 2012/0042386 A1* | 2/2012 | Backer | 726/26 |
| 2012/0221505 A1* | 8/2012 | Evans et al. | 706/52 |
| 2012/0226761 A1* | 9/2012 | Emigh et al. | 709/206 |

FOREIGN PATENT DOCUMENTS

| | | |
|---|---|---|
| JP | 2007/158925 A | 6/2007 |
| WO | WO-01/46843 A2 | 6/2001 |
| WO | WO-03/030528 A2 | 4/2003 |
| WO | WO-2004/052010 A1 | 6/2004 |
| WO | WO-2004/054264 A1 | 6/2004 |
| WO | WO-2006/074305 A2 | 7/2006 |
| WO | WO-2009/070193 A2 | 6/2009 |

OTHER PUBLICATIONS

A Model of a Trust-Based Recommendation System on a Social Network—Published Date: Oct. 18, 2007 http://www.ppgia.pucpr.br/~fabricio/ftp/Aulas/Mestrado/AS/Artigos-Apresentacoes/CoalitionFormation/trust.pdf.

Trust- and Distrust-Based Recommendations for Controversial Reviews—Published Date: 2009 http://www.cwi.ugent.be/patricia/Pasers/pvictor2009b.pdf.

Trust-Based Recommendations for Publications—A Multi-Layer Network Approach—Published Date: 2006 http://www.uni-bamberg.de/fileadmin/uni/fakultaeten/wiai_lehrstuehle/kulturinformatik/Publikationen/Hess_Trust_Based_Recommendations_for_Publications-A_Multi-Layer_Network_Approach.pdf.

Computing and Applying Trust in Web-Based Social Networks—Published Date: Apr. 11, 2005 http://test.lib.umd.edu/drum/bitstream/1903/2384/1/umi-umd-2244.pdf.

Propagation of Trust and Distrust http://www.google.ethz.ch/CDstore/www2004/docs/1p403.pdf.

S. Kamvar, M. Schlosser, and H. Garcia-Molina. The EigenTrust algorithm for reputation management in P2P networks. In Proc. Int. Conf. on World Wide Web, pp. 640651, 2003. kamvar.org/assets/papers/eigentrust.pdf.

C. de Kerchove and P. Dooren. The PageTrust Algorithm: how to rank web pages when negative links are allowed? In Proc. SIAM Int. Conf. on Data Mining, pp. 346352, 2008. http://www.siam.org/proceedings/datamining/2008/dm08_31_dekerchove.pdf.

J. Kleinberg. Authoritative sources in a hyperlinked environment. Journal of the ACM (JACM), 46(5):604 {632, 1999. http://www.cs.cornell.edu/home/kleinber/auth.pdf.

J. Kunegis, A. Lommatzsch, and C. Bauckhage. The slashdot zoo: mining a social network with negative edges. In WWW '09: Proceedings of the 18th international conference on World wide web, pp. 741-750, 2009. http://www2009.eprints.org/75/3/fp348-kunegis.pdf.

L. Page, S. Brin, R. Motwani, and T. Winograd. The pagerank citation ranking: Bringing order to the web. Technical Report, Stanford University, 1998. http://citeseerx.ist.psu.edu/viewdoc/download;jsessionid=7ABD8AB67FA4316A1229CEEA2AE7AB11?doi=10.1.1.31.1768&rep=rep1&type=pdf.

* cited by examiner

RECOMMENDATION RANKING SYSTEM WITH DISTRUST

BACKGROUND

The Internet, and the flexibility it provides, has led to new ways of communication. One significant use of the Internet is used for searching for information from websites where information is posted. To aid people in finding information across a vast number of websites, search engines have been developed. In addition to finding web pages that match user-specified search queries, search engines rank search results in a way intended to surface information that is most useful to the user. One approach to ranking web pages is called PageRank.

The PageRank algorithm is premised on the assumption that web pages to which many other web pages link are valuable. In practice, PageRanks for web pages are determined using a "crawler." A crawler is an automated tool that randomly picks a web page and follows links from that web page to other web pages. As the crawler follows links from page to page, it records the frequency with which it visits a web page as an indication of the PageRank for that page.

Though, it has been recognized that a link to a web page may not necessarily signify that the web page to which a link points is valuable. A first web page may link to a second web page to criticize the second web page or otherwise in a negative fashion. Accordingly, some coding techniques for web pages support coding of links to other web pages as negative links. The crawler may ignore these negative links so that they do not influence the PageRank.

In addition to allowing users to find information available from publicly available web pages, the Internet is used to facilitate feedback from a broad base of individuals. One way broad-based feedback is obtained is through the use of collaborative ranking systems. There are many websites that provide recommendations on restaurants, travel sites, computer games, music and a wide array of other topics. Such sites receive and aggregate user input on a topic and then present that information as a recommendation.

A further use of the Internet is to facilitate interactions broadly called "social networking." In a social network, a group of individuals that agree in some way to be linked can communicate, frequently by posting information on a website to which access is restricted to members of the social network. Examples of such social networking applications are FACEBOOK and LINKEDIN. Through such systems, users can make connections and express their likes or dislikes.

SUMMARY

The inventors have recognized and appreciated that valuable personalized recommendations may be generated by forming a collaborative recommendation based on opinions expressed by members of a social network. In forming the recommendation, information about a level to which members of the social network are trusted by other members may be used in combining the opinions expressed by those in the network. Trust may be expressed as a positive value or a negative value, with a negative value indicating distrust. The trust values may be incorporated into the overall computation of a recommendation such that opinions of members of the network who have a level of trust below a threshold establishing a minimum level of trust are discounted. Opinions of members of the network who have a level of trust above the threshold are combined, with the opinions of those with a higher level of trust being given greater weight.

In some embodiments, levels of trust are determined for individuals in the social network based on the aggregate level of trust expressed in each individual, weighted by the level of trust of the individuals expressing trust. Mathematical techniques may be used to compute trust values for individuals in the network in a way that leads to a consistent solution for values of trust for all members of the network. The solution may be constrained in one or more ways, including ensuring that no individual expressing trust has a disproportionate impact on the overall recommendation regardless of the number of other individuals for which that user expresses trust. Also, individuals that have an aggregate level of trust that is below some threshold may be discounted in computing the solution. In some embodiments, individuals that have an aggregate level of trust that is negative, indicating that they are distrusted by the network, do not affect the computation of trust for other individuals and/or computation of a recommendation.

The inventors have further recognized and appreciated that techniques appropriate for combining opinions in a social network may more generally be applied to any problem that can be modeled as a voting network with propagated distrust. Ranking of web pages may be modeled in this fashion. Web pages may be regarded as defining nodes of such a network. Positive and negative links to web pages may be taken as expression of trust. Accordingly, in some embodiments, the invention may relate to searching for web pages or other content on a network. Trust values may be computed for each web pages based on positive or negative links to the web page weighted by a level of trust computed for the respective web sites that are the sources of the links. A consistent set of trust values may be computed for all websites. As in the case of a social network, the solution for trust values may be subject to constraints, which may be the same or different than the constraints used in the social network context. These computed trust values, may be used in ordering or filtering web pages returned in response to a search query.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

The inventors have recognized and appreciated that existing recommendation ranking systems that incorporate negative trust could be improved. A known approach of simply discounting any information in which distrust has been expressed does not take full advantage of information contained in negative expressions of trust that could improve the recommendation produced by the system.

Another known approach, sometimes referred to as "enemy of an enemy is a friend" (or EEF), though it incorporates negative expressions of trust, does not always produce a desired result. With the EEF approach, information from sources for which distrust has been expressed may be ignored. But, information that is distrusted by a member who in turn is distrusted is considered. However, an individual who is distrusted by someone else who is in turn distrusted by others is not necessarily trustworthy. A similar logic applies to ranking pages returned in response to a web search. A first web page to which a second web page contains a negative link is not necessarily more useful if yet a third web page has a negative link to the second web page. For this reason, EEF may not produce an accurate result.

The inventors have recognized and appreciated that an improved approach to incorporate negative trust information into a ranking system can increase the utility of the ranking produced. The negative expressions of trust may be incorporated in a way that they can offset positive expressions of trust in determining a degree to which information is trusted, but without allowing distrusted information to influence the output.

Figure 1:
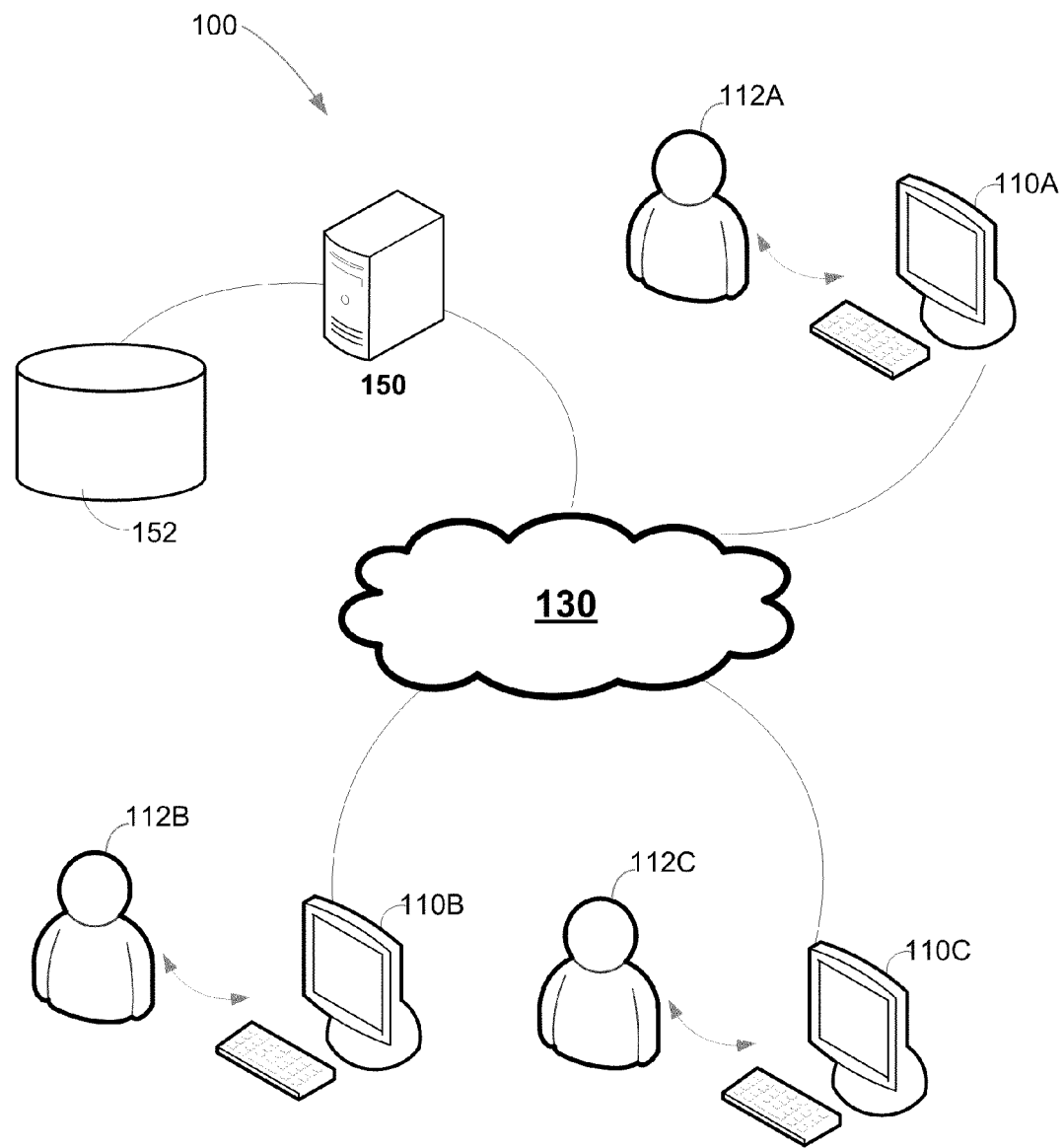
FIG. 1 is a conceptual sketch of a social network according to some embodiments.

A recommendation ranking system that incorporates negative trust information may be applied, as one example, in the context of a social network. FIG. 1 provides an example of a social network 100 that may include a recommendation ranking component. Social network 100 connects multiple individuals who are members of the social network in a way that allows them to share information. In the example of FIG. 1, individuals 112A, 112B and 112C are illustrated. It should be recognized that three individuals are shown for simplicity. However, a social network may join any number of people, and likely may join hundreds or thousands of people.

Each of the individuals 112A, 112B and 112C accesses the social network 100 through a user computer, here illustrated as user computers 110A, 110B and 110C. In this example, user computers 110A . . . 110C are illustrated at desktop computers. However, it should be appreciated that an individual may access social network 100 through any computing device, and desktop computers are shown for simplicity of illustration.

Each of the user computers 110A . . . 110C are coupled through a network 130 to a server 150 managed by an operator of the social network. In this example, network 130 may be the Internet. Though, it should be appreciated that any network or combination of networks that allow exchanges of information among multiple individuals may be used to form a social network.

Server 150 is an example of a computing device that may manage interactions between the individuals that are members of social network 100. Server 150 may be programmed with computer executable instructions that perform functions that allow an individual to start a social network or invite other individuals to join the social network. Server 150 may also be programmed to allow individuals who are members of social network 100 to access information from or communicate with other individuals who are also members of social network 100.

Server 150 is coupled to database 152. Database 152 may hold information relating to management of social network 100. For example, database 152 may store information identifying individuals who are members of social network 100. Database 152 may also store information supplied by individuals who are members of the social network. Server 150 may manage access to such information, ensuring that information intended for sharing among the individuals that are members of social network 100 may access that information.

Figure 2A:
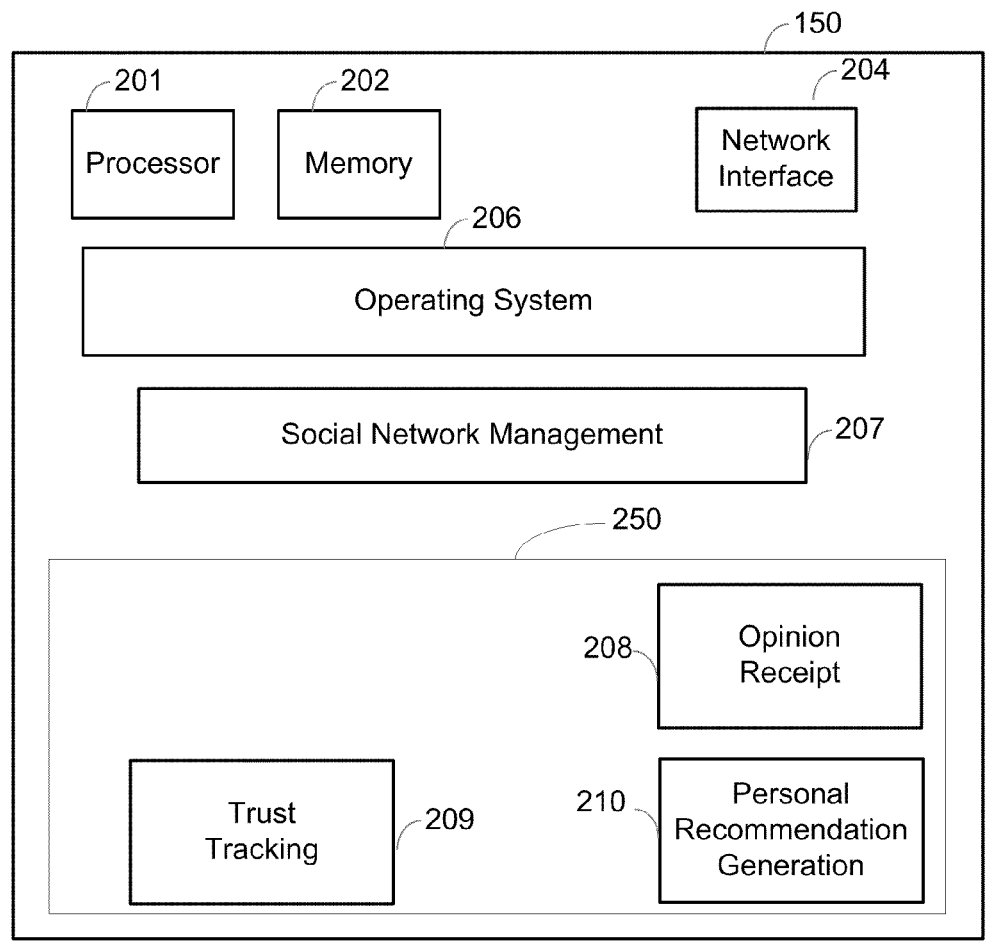
FIG. 2A is a functional block diagram of a server implementing the social network of FIG. 1.

Social networks are known, and social network 100 may be implemented using techniques as are known in the art. However, server 150 may be modified to incorporate a recommendation ranking component. FIG. 2 is a functional block diagram of server 150. It should be appreciated that FIG. 1 and FIG. 2A illustrate server 150 as a single computing device. However, the functions depicted in the functional block diagram of FIG. 2A may be implemented across multiple computing devices.

FIG. 2A shows that server 150 includes hardware components, all of which may be as known in the art. As illustrated, in some embodiments, server 150 comprises a processor 201, memory 202 and network interfaces 204.

Processor 201 may be a processor, or combination of processors or processor cores, as known in the art. For example and not limitation, processor 201 may be a central processing unit (CPU), digital signal processor (DSP), controller, addressable controller, general or special purpose microprocessor, microcontroller, addressable microprocessor, programmable processor, programmable controller, dedicated processor, dedicated controller, or any other suitable processing device.

Memory 202 may store data and/or software modules containing computer-executable instructions that when executed by processor 201 perform a desired function. Memory 202 may be a computer-readable storage medium as is known in the art or any suitable type of computer-readable storage medium. For example and not limitation, memory 202 may be RAM, a nanotechnology-based memory, one or more floppy discs, compact discs, optical discs, volatile and non-volatile memory devices, magnetic tapes, flash memories, hard disk drive, circuit configurations in Field Programmable Gate Arrays, other semiconductor devices, or other tangible computer storage medium or combination thereof.

Server 150 may include any suitable number of network interfaces 204. Each network interface may be an interface suitable for wired and/or wireless communication and may be implemented through any suitable combination of hardware and software configured to communicate over a network. For example, a network interface may be implemented as a network interface driver and a network interface card (NIC). The driver may be configured to receive instructions from other components of server 150 to perform operations with the NIC. Network interfaces 204 allow server 150 to communicate with user computers 110A . . . 110C over network 130 (FIG. 1).

Server 150 may also include modules configured to perform specific functions. In the illustrated embodiment, server 150 includes an operating system 206 (OS), social network management module 207 and recommendation ranking module 250. Though, server 150 may have any suitable modules. Modules may be implemented in hardware, software, or any suitable combination thereof. In some embodiments, a module may comprise computer-executable instructions. The instructions may be stored in memory 202 and executed by processor 201.

OS 206 may manage the activities and sharing of resources of server 150. OS 206 may provide various functions and manage server 150 through various components. These components may include, for example and not limitation, dynamically linked libraries (e.g., a dynamic-link library), application programming interfaces (APIs), component object models (COMs), globally unique identifiers, registry keys, or any uniquely identifiable part of OS 206.

OS 206 may be implemented using techniques as are now known in the art for implementing operating systems. Though, any suitable techniques, whether now known or hereafter developed, may be used to implement OS 206. In some embodiments, operating system 206 may be a conventional operating system.

Social network management 207 may perform functions associated with establishing a social network, such as social network 100. The functions performed by social network module 207 may be functions as are performed by conventional social networks. Those functions may include admitting new members to the social network, receiving information from members of the network and sharing information from one member of the network with other members of the social network. Though FIG. 1 illustrates a single social network hosted by server 150, it should be appreciated that server 150 may support multiple independent social networks. Accordingly, social network management 207 may also perform functions relating to segregating information provided by members of one social network from members of other social networks. However, such functions are known in the art and social network management module 207 may be implemented using known techniques or in any other suitable way.

In the embodiment illustrated, server 150 also includes a recommendation ranking module 250. Recommendation ranking module 250 may perform functions associated with allowing members of social network 100 to obtain recommendations based on opinions, and trust, expressed by members of the social network. Those functions may include receiving and storing opinions from members of the network on one or more topics.

FIG. 2A illustrates that recommendation ranking module 250 includes sub-modules to perform functions associated with generating recommendations. FIG. 2A illustrates that recommendation ranking module 250 contains opinion receipt sub-module 208, trust tracking sub-module 209 and personal recommendation generation sub-module 210. Though, it should be recognized that these sub-modules are illustrative, not limiting, and that recommendation ranking module 250 alternatively or additionally may contain other sub-modules.

The sub-modules in recommendation ranking module 250 may interact to generate personal recommendations for members of social network 100. Opinion receipt sub-module 208 may receive opinions relating to one or more topics from members of the social network. Opinion receipt sub-module 208 may store the opinions in a format that allows opinions relating to the same or similar topics expressed by multiple members of the social network to be identified and processed together to generate a recommendation.

Trust tracking sub-module 208 may receive and store information relating to the trust that members of the social network express for the members of the network. Trust tracking sub-module 209 may record such trust information in any suitable way. In some embodiments, trust information may be context specific such that opinions expressed on different topics, even if expressed by the same member of the social network, may be afforded different levels of trust. Accordingly, the trust information recorded by trust tracking sub-module 209 may be recorded in connection with a specific context in which it applies. For example, trust information may be recorded for each opinion and that trust information may be used whenever the opinion is used to form a recommendation. Though, in some embodiments, trust information may be recorded based on categories of opinions and may be applied when a recommendation is request on a topic falling in the category. For example, trust tracking sub-module 209 may separately record trust information associated with categories such as restaurants, sports or politics. As a further alternative, trust tracking sub-module 209 may record information about a general level of trust afforded to members of the social network and apply this general trust information regardless of context.

Moreover, trust information may be stored in such a way that it may be related to specific individuals. Though, other approaches for capturing trust information may be used. In some embodiments, trust information may be grouped by profile of individual. As an example of such an approach, trust information may be stored based on age range. Such an approach may be useful to compute recommendations involving tastes or experiences that may be age dependent.

In addition to organizing trust information on a member in which trust is expressed, the trust information may be organized based on the member expressing trust. Though, regardless of how trust information is stored, trust tracking sub-module 209 may receive expressions of trust and store them so that they can be retrieved when a recommendation is requested in a context in which the expression of trust is relevant. Accordingly, when trust information is used to compute a recommendation, trust tracking sub-module 209, based on context, may retrieve trust information applicable to any member of the network.

Recommendation ranking module 250 may also include a personal recommendation generation sub-module 210. Personal recommendation generation sub-module 210 may be activated in response to input from a member of social network 100 requesting a recommendation. In response, personal recommendation generation sub-modules 210 may search database 152 for opinions relating to the topic of which the personal recommendation is requested. The opinions may be weighted in accordance with trust information stored by trust tracking sub-module 209. The net result may be presented to a user as a personal recommendation.

Figure 2B:
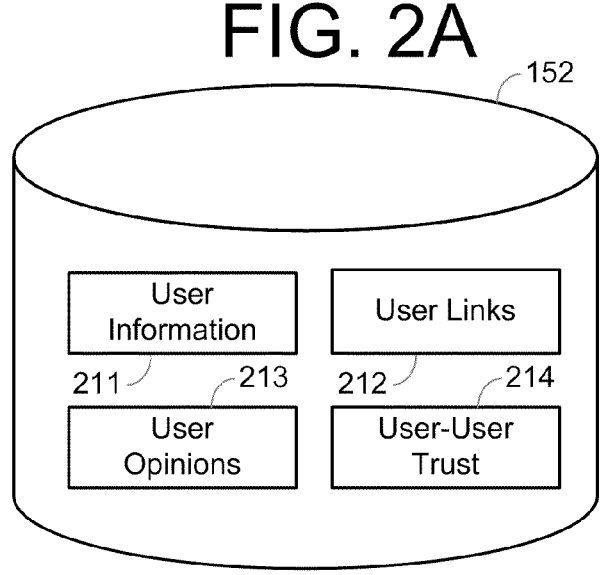
FIG. 2B is a block diagram conceptually illustrating information maintained in a database used in the social network of FIG. 1.

To support personal recommendation generation, database 152 may store multiple types of information. FIG. 2B conceptually illustrates some of the types of information that may be stored in database 152 to facilitate management of social network 100 in a way that allows personal recommendations to be generated. FIG. 2B shows, as an example, that database 152 contains user information 211. User information 211 may identify users who subscribe to the social networking services provided through server 150.

Database 152 may also store user links. In a social network, members are added to the network based on a link to an existing member of the network. Personal network management module 207 may maintain links, stored as user links 212, that identify users connected through social network 100.

Additionally, database 152 may contain user opinion information 213. User opinion information 213 may be stored by opinion receipt sub-module 208. This information may be stored in any suitable way. Likewise, database 152 may contain user to user trust information 214, which may be stored by trust tracking sub-module 209.

Figure 3:
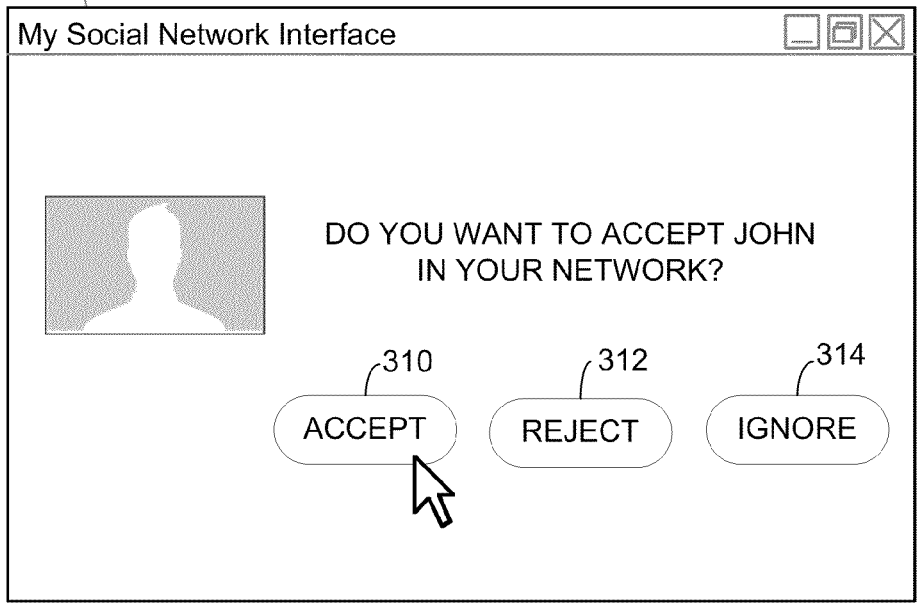
FIG. 3 is a sketch of a graphical user interface, presented by a social networking system, through which members may be added to the social network.

Information in database 152 may be collect in any suitable way, including through express or implied user inputs. FIGS. 3, 4A, 4B, 5 and 6 illustrate graphical user interfaces that may be presented to members of a social network during some of the operations performed by server 150 to collection such inputs. The illustrated interfaces may appear on the displays associated with user computers, such as user computers 110A . . . 110C (FIG. 1). FIG. 3 illustrates a graphical user interface 300 that may be presented to a first user. Through the graphical user interface 300, the first user may add a second user to the social network. Though, any suitable mechanism may be used for managing the social network. In this example, a second user has sent a request to the first user, triggering personal network management module 207 (FIG. 2A) to generate graphical user interface 300. Through graphical user interface 300, the first user may select control 310 that accepts the second user into the social network of which the first user is already a member. Other options, reflected by controls 312 and 314 may also be present. However, in the embodiment illustrated, the first user has elected to accept the second user into the social network. Accordingly, the second user, designated as "John" in this example, is added to the social network.

Figure 4A:
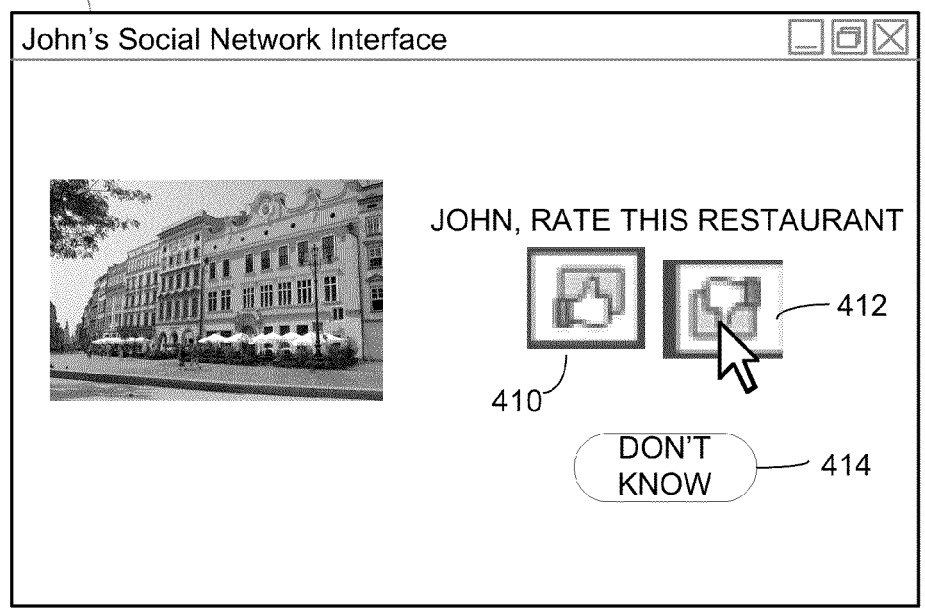
FIG. 4A is a sketch of a graphical user interface through which a member of a social network may express an opinion.

FIG. 4A illustrates a further graphical user interface that may be presented to the second user, John in this example, as a member of the social network. In this example, graphical user interface 400 is presented to John to obtain an opinion. Graphical user interface 400 may be generated by opinion receipt sub-module 208 (FIG. 2A). In this example, opinion receipt sub-module 208 is obtaining an opinion relating to a restaurant. Though, it should be recognized that graphical user interface 400 provides just one example of the types of information about which opinions of members of the social network may be received.

Graphical user interface 400 may be presented in response to any suitable triggering event. For example, the second user, John, may provide an input expressly indicating a desire to provide an opinion. In other embodiments, recommendation ranking module 250 may periodically poll members of the network requesting opinions. As yet a further example, a sub-module of recommendation ranking module 250 may monitor input provided by members interacting with the social network system to detect input indicating a connection with a topic about which an opinion may be solicited. As an example, the second user, John, may send a message through the social networking system containing the name of the restaurant to be ranked or other indication that John has a connection with the restaurant. Accordingly, it should be appreciated that the triggering event for receiving opinions is not critical to the invention.

Regardless of the triggering event, opinion receipt sub-module 208 may collect through graphical user interface 400 an opinion regarding the topic presented in graphical user interface 400. Opinion receipt sub-module 208 may receive opinions in any suitable format. In the example illustrated in FIG. 4A, the opinion collected may take on one of a discrete number of values. Accordingly, graphical user interface 400 contains interface elements through which a user may input one of a discrete number of choices representing the member's opinion. In the example of FIG. 4A, graphical user interface 400 contains a control 410, a control 412 and a control 414. Control 410 may be selected to express a favorable opinion. Control 412 may be selected to express an unfavorable opinion. Control 414 may be selected to indicate that the member expresses no opinion.

In this example, each opinion may be expressed as a plus one, a minus one, or a zero. A plus value indicating a favorable opinion and a negative value indicating an unfavorable opinion. A zero may indicate no opinion has been expressed. Representing opinions as having a value from a set consisting of $\{-1, 0, +1\}$ may simplify mathematical operations used to form a recommendation. However, it should be recognized that any suitable format may be used for representing opinions.

Figure 4B:
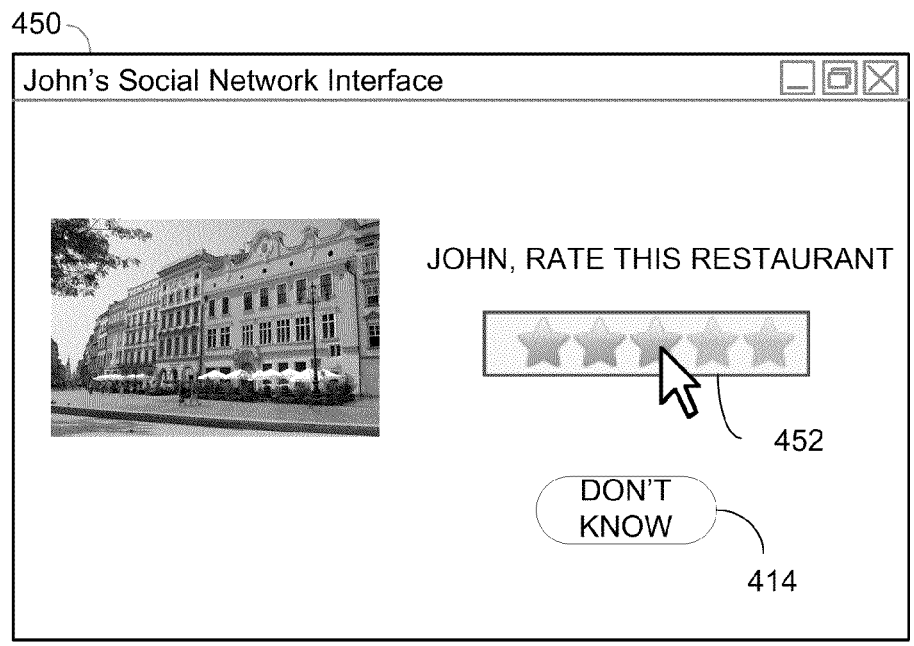
FIG. 4B is a sketch of an alternative embodiment of a graphical user interface through which a member of a social network may express an opinion.

FIG. 4B provides an example of a graphical user interface through which an opinion represented in an alternative format may be obtained. Graphical user interface 450 may be presented by recommendation ranking module 250 (FIG. 2A) in the same scenarios as graphical user interface 400 (FIG. 4A). However, graphical user interface 450 differs from graphical user interface 400 in that it is configured to receive an opinion that may take on more than two values. In graphical user interface 450, control 452 is presented to a member of a social network for receiving an opinion. In this example, the opinion may be expressed as one of a discrete number of choices. Specifically, control 452 allows the member to express an opinion as a number of stars. One star may express a relatively unfavorable opinion, with five stars expressing a relatively favorable opinion. Two, three or four stars may be selected to express opinions in between. As with graphical user interface 400, graphical user interface 450 includes a control 414, which a user may select to indicate that the user has no opinion or does not wish to express an opinion.

Opinion receipt sub-module 208 (FIG. 2A) may record an opinion based on the number of stars specified through control 452. A value for the opinion expressed may be stored by opinion receipt sub-module 208 in any suitable format. For example, a number from the set $\{0, 1, 2, 3, 4, 5\}$ may be stored to represent the number of stars selected through control 452. Though, it should be recognized that any suitable value may be correlated to any user input, and the specific value stored to reflect user input expressing an opinion may vary from scenario-to-scenario. As an example of a possible variation, the value stored to reflect an opinion expressed by a member may vary non-linearly in proportion to the number of stars selected through control 452.

As an example of another possible variation, though controls 410, 412 and 452 allow a discrete number of choices for an opinion, there is no requirement that an opinion expressed by a member be selected from a set of discrete choices. In some embodiments, a graphical user interface, such as graphical user interface 450, may include a control through which a user may express an opinion corresponding to a point in a continuous range of values. Such inputs may be obtained for example, by controls shaped as sliders or text boxes in which a user may enter a number, as examples of possible variations. Accordingly, it should be recognized that the format in which opinions are input and stored for use by recommendation ranking module 250 are not limitations on the invention.

Figure 5:
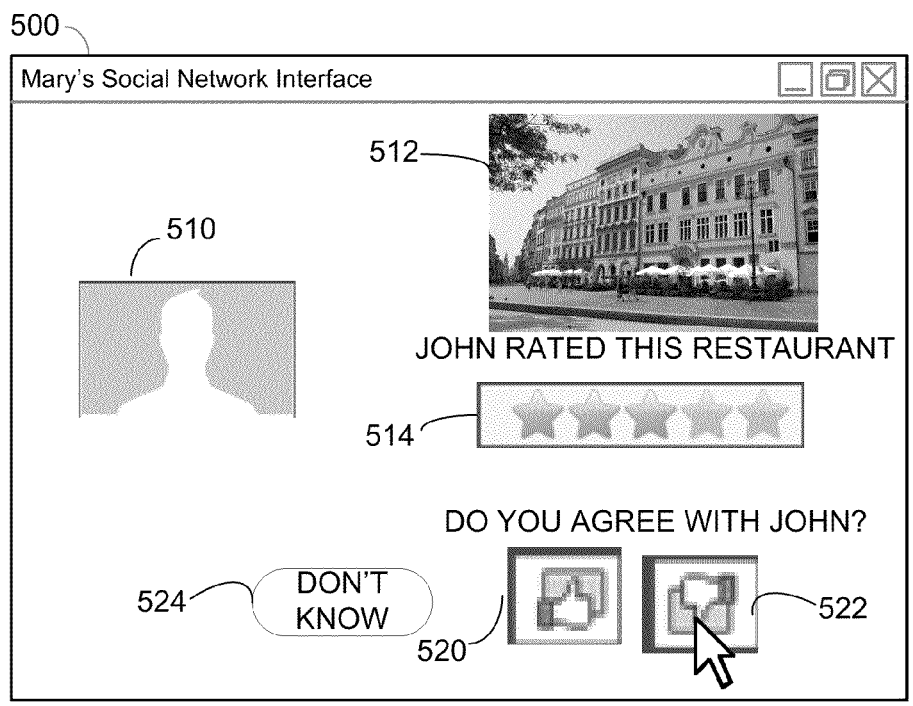
FIG. 5 is a sketch of a graphical user interface through which a first member of a social network may express trust in a second member.

In addition to obtaining opinions, recommendation ranking module 250 may also collect information about trust. In the context of social network 100 in which recommendations are generated based on opinions expressed by members of the social network, information about trust may reflect a belief that a member shares the taste of or agrees with opinions expressed by another member. Though, in some scenarios, tracking trust that members have in themselves may be useful. Such trust information also may be obtained from input of the members. FIG. 5 illustrates a graphical user interface 500 through which a member may input information that recommendation ranking module 250 interprets as an expression of trust.

In the scenario illustrated in FIG. 5, trust tracking sub-module 209 (FIG. 2A) has presented graphical user interface 500 to a third member of the social network, identified as "Mary" in FIG. 5. Though, it should be appreciated that a graphical user interface in the format of graphical user interface 500 may be presented to any one of the members of social network 100, including the user who invited John into the social network or even John himself, about whom trust information is being obtained through graphical user interface 500.

A graphical user interface in the form of graphical user interface 500 may be presented to a member of the social network at any suitable time. In some embodiments, trust tracking sub-module 209 may present graphical user interface 500 in response to a member viewing information about a topic on which another member has expressed an opinion. In the example of FIG. 5, graphical user interface 500 relates to a restaurant about which John has expressed an opinion. Accordingly, graphical user interface 500 may be presented to Mary if Mary requests information about the same restaurant. Alternatively, graphical user interface 500 may be presented to a member upon trust tracking sub-module 209 identifying in a communication from a member that the member may have a reason to consider an opinion expressed by a member or otherwise provide input that directly or indirectly indicates trust in opinions of members or categories of members.

Regardless of the event that triggers graphical user interface 500 to be presented to a member, an expression of trust may be obtained from the member through the graphical user interface. To facilitate obtaining an expression of trust, graphical user interface 500 may provide information about the member or members about which trust is to be expressed. In this example, graphical user interface 500 includes item 510, which identifies the member that expressed an opinion. In the illustration of FIG. 5, item 510 may be a photo of the member that expressed an opinion. Though, member may be identified in any suitable way.

Graphical user interface 500 may also include information about a context in which the expression of trust applies. Graphical user interface 500 also includes item 512 providing information about a topic on which the member expressed an opinion. In this example, the opinion was expressed about a restaurant. Item 512 includes a photo depicting the restaurant. Though, as noted above, information may be presented through graphical user interface 500 in any suitable form.

Further, graphical user interface 500 may include item 514 providing information about the opinion. In this example, item 515 is in the form of a graphical indication of an opinion using a number of stars. Such display may be appropriate for an opinion entered through a control such as control 452. Though, any suitable representation, including a textual description of the opinion, may be incorporated in graphical user interface 500.

Graphical user interface 500 also includes elements through which a member, Mary in this example, may express trust. In this example, trust is expressed in terms of agreement or disagreement with the opinion. Accordingly, graphical user interface 500 includes a control 520 through which Mary could express agreement with the opinion represented by item 514. Control 522 may be used to express disagreement. Control 524 may be used if Mary does not wish to express agreement or disagreement with John's opinion. Though, any suitable user interface elements may be used to obtain input relating to agreement or disagreement with the opinion.

Trust tracking sub-module 209 (FIG. 2A) may use the input provided through one of control's 520, 522 or 524 to develop a value of trust that may be used in computing a personalized recommendation for any member of social network 100. In some embodiments, inputs on multiple opinions may be aggregated into a single trust value. For example, trust tracking sub-module 209 could track trust on an individual recommendation by recommendation basis. However, in some embodiments, trust may be tracked based on a higher level categorization of opinions. For example, the system may develop values of trust for a member's opinions in certain categories, such as restaurants, sports or politics. In such an embodiment, expressions of trust may be aggregated based on category. Though, it should be appreciated that it is not necessary that expressions of trust be aggregated in accordance with specific categories. In some embodiments, expressions of trust in John's opinions may be aggregated, regardless of the nature of the opinion expressed by John. As a further specific example, in embodiments in which trust tracking sub-module 209 is aggregating expressions of trust for a category that includes opinion on restaurants, input received through one of controls 520, 522, or 524 may be averaged or otherwise aggregated, with other expressions of trust for opinions John has expressed relating to restaurants.

Regardless of the level at which inputs relating to expressions of trust are aggregated, expressions of trust may be aggregated on a member-to-member basis. In the example of FIG. 5, a third member, Mary, has made an expression of trust in the second member, John. This expression of trust may be aggregated only with other expressions of trust made by Mary for John's opinions. As a result, the aggregated expressions of trust may be a member-to-member expression of trust, reflecting the trust that Mary places in John.

Figure 6:
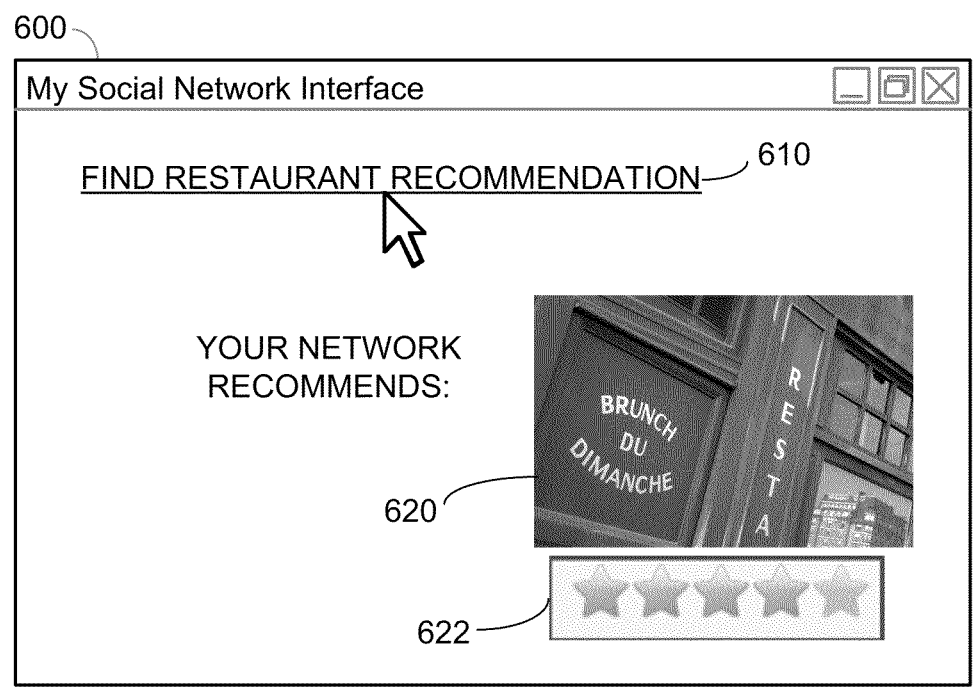
FIG. 6 is a sketch of a graphical user interface through which a user may receive a personalized recommendation based on opinions and trust expressed by members of a social network.

Based on the opinions of multiple members, which may be collected graphical user interfaces such as those illustrated in FIGS. 4A and 4B, and expressions of trust, such as may be obtained through graphical user interface such as that illustrated in FIG. 5, personal recommendation generation sub-module 210 (FIG. 2A) may generate a personalized recommendation. FIG. 6 illustrates a graphical user interface 600 through which a member of social network 100 may request a personalized recommendation. In this example, graphical user interface 600 is illustrated as having a control 610 through which a user may request a personalized recommendation on a specific topic.

In this example, that specific topic is restaurants in general. It should be appreciated that for simplicity graphical user interface 600 shows only a single topic on which a recommendation could be requested. Though, a user interface through which a member may request a recommendation may present multiple choices. Further, a graphical user interface may include controls or other items through which a user may qualify a topic on which a recommendation is desired. In the case of a recommendation for a restaurant, graphical user interface 600 may contain controls through which a user may specify a geographic region in which a recommended restaurant should be located. Alternatively or additionally, graphical user interface 600 may include controls through which a user can specify values of other parameters defining the topic on which a recommendation is requested, such as a price range or a type of cuisine. However, such variations are not shown in FIG. 6 for simplicity. Further, it should be recognized that graphical user interface 600 shows an example of a recommendation in which express user input is provided to request a personalized recommendation. Personal recommendation generation sub-module 210 may operate in response to any suitable trigger. For example, personalized recommendation generation sub-module 210 may monitor user input to detect a message or other interaction with social network 100 suggesting that a member may want a recommendation on a topic.

Regardless of the manner in which generation of a personalized recommendation is triggered, personalized recommendation generation sub-module 209 may, in response to a request for a recommendation, generate a personalized recommendation for the requesting member. Personal recommendation generation sub-module 210 may generate the personal recommendation based on opinions of other members of social network 100 on the topic for which a recommendation is desired. Personal recommendation generation 210 may aggregate the opinions from multiple members of the network to form an overall personalized recommendation. Accordingly, graphical user interface 600 is shown to contain an item 620 identifying the recommendation. In this example, item 620 contains a photograph of a restaurant selected in response to a request for a restaurant recommendation. Though, it should be recognized that the recommendation may be presented in any suitable way.

In addition to providing an overall recommendation, personal recommendation generation 210 may provide information representing the strength of the recommendation. In this example, a graphical user interface 600 contains an item 622 representing the aggregate opinion of the recommended restaurant. In this example, the aggregate opinion is represented in item 622 by a number of stars. Such a user interface may be appropriate in embodiments in which opinions are obtained through a control, such as control 452 (FIG. 4B). However, even in embodiments in which opinions are expressed in other formats, an aggregate value representing the overall opinion may take on a value within a defined range. Accordingly, item 622 may be used to display a personalized recommendation even in embodiments in which opinions are obtained through controls, such as controls 410 and 412 (FIG. 4A). Though, it should be appreciated that the format in which an aggregate opinion is represented is not critical to the invention.

Though not shown in FIG. 6 for simplicity, other representations of the strength of the aggregated opinion may be presented. For example, graphical user interface 600 may contain items representing the number or percentage of members of the social network 100 that expressed a favorable opinion of the recommended item and/or the percentage of members of social network 100 that expressed an unfavorable opinion.

Regardless of the manner in which the recommendation is displayed, personal recommendation generation sub-module 210 may generate the recommendation and associated information based on opinions expressed by members of the social network 100 and expressions of trust also from members of social network 100. As described above, opinions may be expressed on multiple topics. Expressions of trust may be aggregated into categories that may be relevant to recommendations on different topics. Accordingly, in preparing a recommendation, such as presented through graphical user interface 600, personal recommendation generation sub-module 210 may select, based on the context of the request for a recommendation, an appropriate set of opinions and expressions of trust. In this specific example of FIG. 6, personal recommendation generation sub-module 210 will select opinions related to restaurants and expressions of trust associated with a category appropriate for use in computing a recommendation for a restaurant.

Regardless of the category to which the trust relates, values representing member-to-member expressions of trust used in computing the recommendation may take on a range of values, including values that represent negative trust. To compute the overall recommendation, personal recommendation generation sub-module 210 may compute for each member a trust value from the values representing member-to-member expressions of trust, and the trust values computed for the members may be used to weight the opinions of those members expressing an opinion relevant to the recommendation being generated by personal recommendation generation sub-module 210. Each opinion may be weighted in proportion to the trust value computed for the member expressing the opinion.

In order to compute trust values for individual members, an approach for combining positive and negative member-to-member expressions of trust may be employed. Negative values for member-to-member expressions of trust may be used to reduce the influence of members of the network. However, in some embodiments, inputs provided by members that have a computed trust value that in the aggregate is below some threshold associated with a minimum level of trust may be discounted, such that inputs of untrusted members may be discounted. In some embodiments, that threshold may correspond to zero trust such that inputs of untrusted members relating to an opinion may be discounted. Alternatively or additionally, inputs representing expressions of trust may also be discounted when made by members that overall have a computed trust value that is below the threshold associated with a minimum level of trust may be discounted.

A complexity arises if trust values for individual members are computed based on trust expressed by other members but the inputs of some members are discounted based on level of trust computed for them. In discounting the inputs of some members, the computation of trust values for the members may be impacted, which may in turn impact which members should be discounted. One approach for addressing this scenario is to iteratively compute trust values for the members of the network. At each iteration, trust values may be computed for members based on member-to-member trust values associated with members determined in the prior iteration to have a positive level of trust. Based on that computation, if the set of members having a positive level of trust, and are therefore considered in computing the trust values for other members, changes, a further iteration may be performed. Iterations may be performed in this fashion until a consistent solution is obtained.

Figure 7:
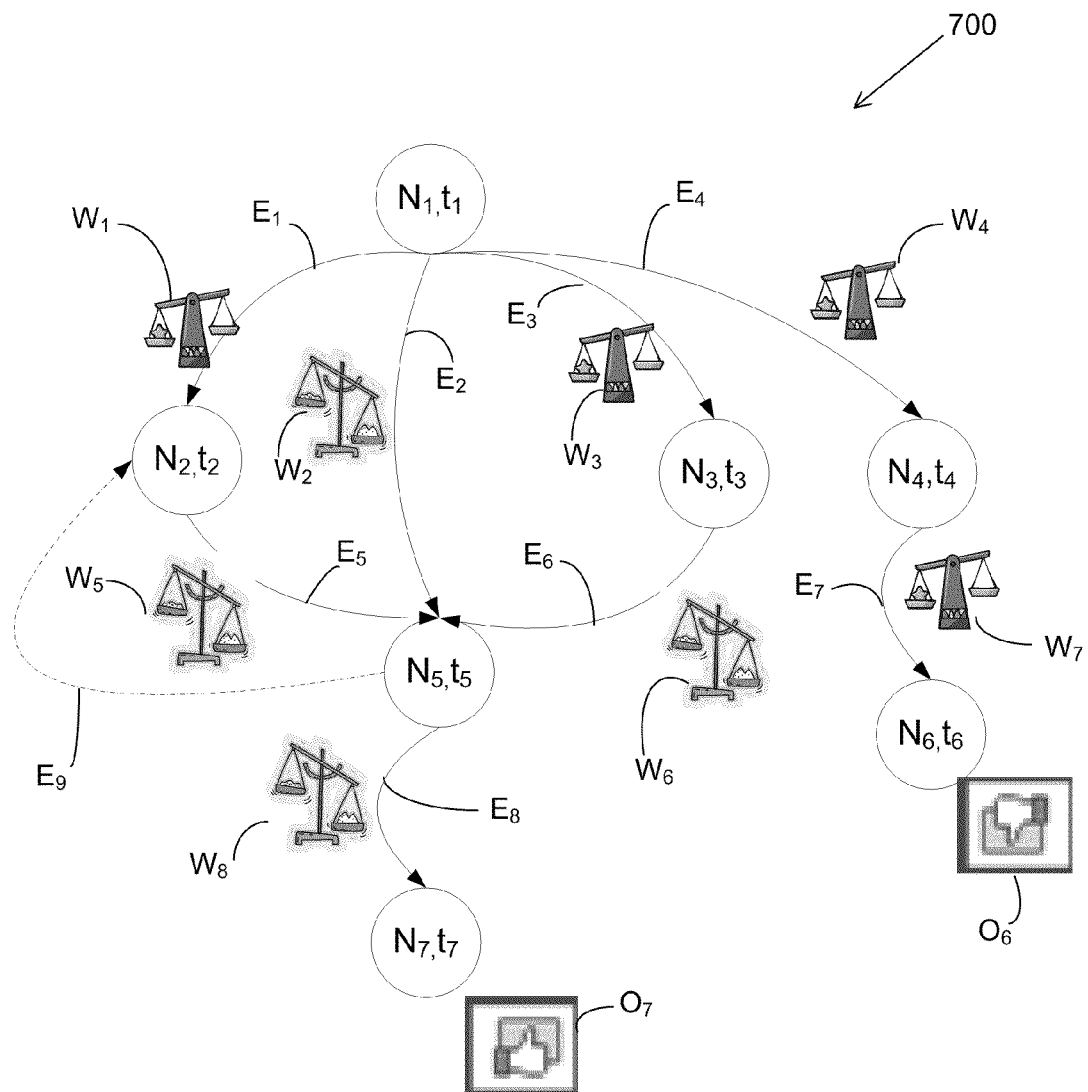
FIG. 7 is a graphical representation of a data set representing opinions and expressions of trust as a voting network having multiple nodes interconnected by edges.

Such a computation may be understood by reference to FIG. 7, which illustrates a model by which data representing opinions and expressions of trust may be combined to produce an overall recommendation. In the example of FIG. 7, each of the members of social network 100 may be presented as a node. In this example, seven members are represented by nodes $N_1$, $N_2$, . . . $N_7$. Network 700 may include edges between the nodes. The edges may represent connections between members based on trust tracking sub-module 209 storing a value for a member-to-member expression of trust for members represented by the nodes joined by the edge. Each of the edges may have associated with it a value representing the member-to-member trust value. That value may be expressed as a weight of the edge.

In this example, an edge $E_1$ is shown connecting nodes $N_1$ and $N_2$. An edge $E_2$ is shown connecting nodes $N_1$ and $N_5$. Edge $E_3$ is shown connecting node $N_1$ to node $N_3$. Edge $E_4$ is shown connecting node $N_1$ to node $N_4$. Edge $E_5$ is shown connecting node $N_2$ to node $N_5$. Edge $E_6$ connects node $N_3$ to node $N_5$. Edge $E_7$ connects node $N_4$ to node $N_6$. Edge $E_8$ connects node $N_5$ to node $N_7$.

Each of the edges is shown to have a weight $W_1, W_2, \ldots W_8$. In the example of FIG. 7, the weights are shown to have values expressing trust that are either positive or negative. Weights $W_1, W_3, W_4$ and $W_7$ are shown to have a positive value. In contrast, weights $W_2, W_5, W_6,$ and $W_8$ are shown to have negative values. However, it should be recognized that specific values are not critical. Also, it should be recognized that the number of discrete values or the allowed range of values for weights is not critical to the invention.

Regardless of how the weights are represented, network 700 may represent data selected from personal recommendation generation sub-module 210 from database 152 in response to a personalized recommendation in a topic. Node $N_1$ may represent the member requesting the recommendation. Each of the edges, and the nodes joined by the edges, may be identified based on member-to-member expressions of trust stored in trust information 214 (FIG. 2B) that is relevant to the topic on which the recommendation is requested. As can be seen, network, 700 includes nodes and edges for other members in whom the member represented by node $N_1$ has expressed trust. The network 700 is built out by including nodes and edges for members in which those members have expressed trust (in the relevant context), and so on.

Once the relevant data is obtained, personal recommendation generation sub-module 210 may generate individual trust values for the members reflected in network 700. Here, computed trust values $t_1, t_2, \ldots t_7$ are computed. In network 700, the members represented by nodes $N_6$ and $N_7$ have expressed opinions, $O_6$ and $O_7$. An overall recommendation is computed by averaging a value associated with opinion $O_6$, which in this example is negative weighted by trust value $t_6$ plus the value associated with opinion $O_7$, which in this case is positive, weighted by trust value $t_7$. Though, the trust values $t_6$ and $t_7$ depend on trust values of other nodes. Accordingly, generating a recommendation entails computing trust values for nodes in network 700, even those that did not directly express an opinion.

In some embodiments, each computed trust value represents the aggregate of weighted member-to-member trust values into each node. The weights to be applied to each member-to-member trust value are determined based on the computed trust for the member expressing trust. For example, if the member represented by node $N_1$ is the only member that has expressed trust in the member represented by node $N_2$, the value of trust $t_2$, computed for node $N_2$, equals the member-to-member trust value $W_1$ weighted by trust $t_1$. This scenario may be more complex if multiple members have expressed trust in another member. For example, network 700 shows that the members represented by nodes $N_1, N_2,$ and $N_3$ have all expressed trust in the member represented by $N_5$. Accordingly, the value of trust $t_5$ equals $W_2t_1+W_5t_2+W_6t_3$.

In a scenario in which the nodes are linked in a network 700 in a hierarchical fashion, computation of trust values for each node may be relatively straight-forward. The computation may begin at the root node $N_1$, which represents the member requesting the personalized recommendation. That member may be assigned a trust $t_1$ equal to a value indicating full trust. As an example, $t_1$ may be assigned a value of 1. Though, it should be recognized that the numerical representation of trust is not critical to the invention. Also, though it may be assumed that a member requesting a recommendation has full trust in themselves, embodiments may be formed in which the root node of a network, such as network 700, is assigned a value other than a value representing full trust.

Regardless of what value of trust $t_1$ is assigned to the root node, once that value is assigned, the trust may be propagated to other nodes in the network. For example, from node $N_1$, trust may be propagated to node $N_2$, node $N_3$ and node $N_4$. The trust values may be propagated by multiplying the trust of the route node, $t_1$ by the weights assigned to the edges linking the route node to each of nodes $N_2, N_3, N_4$. Once values of trust $t_2$ and $t_3$ are computed, the trust may be propagated to node $N_5$. Similarly, once trust value $t_4$ is computed, the trust may be propagated to node $N_6$ by computing $t_6$ equals $W_7t_4$.

So long as the network 700 is hierarchical, trust may be propagated to lower levels of the hierarchy in this fashion. However, in a social network containing numerous members, member-to-member trust may not be representable by a purely hierarchical network. For example, an edge $E_9$ may be included in network 700, reflecting an expression of trust for the member represented by node $N_2$ made by the member represented by node $N_5$. With edge $E_9$ included in network 700, the trust value $t_2$ for node $N_2$ is computed as $W_1t_1+W_9t_5$, where $W_9$ represents the member-to-member trust expressed by the member associated with node $N_5$ for the member associated node $N_2$.

This network configuration sets up a scenario in which the value of $t_2$ depends on the value computed for $t_5$, but the value of $t_5$ depends on the value computed for $t_2$. Despite such interlocking dependencies, consistent values for trust associated with each of the nodes may be computed in an iterative fashion. As one example of an iterative approach, each of the nodes may be initially assigned a trust value such as one or one-half, representing full trust or a half amount of trust, respectively. Trust may be computed for each of the nodes based on the assigned trust values in an initial iteration. In a subsequent iteration, the trust values may be recomputed based on the trust values computed in the preceding iteration. The computation may proceed in this fashion until consistent values are obtained.

In the example in which edge $E_9$ is included, proceeding until a consistent value is obtained may mean that the value of trust $t_2$, in combination with the assigned value for $t_1$ and the computed value for $t_3$, yields the value computed for trust $t_5$ while the value computed for trust $t_5$, in combination with the assigned value for $t_1$, yields the value computed for trust $t_2$. Iterative processing may proceed until the values computed for trust at all of the nodes are consistent across network 700. Though, it should be recognized that in some embodiments, it may not be necessary or desirable to iterate computations of trust until exact equality is achieved. Consistency, for example, may be defined to have been achieved when iteration-to-iteration changes in computed trust values is below a threshold.

Computation of trust values in the fashion allows constraints to be imposed on the solution. At that start of the computation, at each iteration of the processing or at other suitable time, constraints may be applied. One such constraint may be that a node that is in the aggregate distrusted by members of the network not impact the recommendation produced using the network. Accordingly, in some embodiments, opinions expressed at nodes having a computed level of trust below some threshold may not be aggregated with other opinions in forming an overall recommendation. In an embodiment in which a recommendation is formed by weighting an opinion at a node by a trust value for that same node, this result may be achieved by setting to zero any trust value at a node that is below the threshold associated with a minimum level of trust to zero. In some embodiments, the threshold associated with a minimum level of trust may also be zero. Accordingly, if, in any iteration, a computed value of trust at any node is negative, that trust value may be changed to zero. In a subsequent iteration, that trust value, set to zero, may be used in computing trust values for other nodes.

Another constraint that may be imposed for the computation of trust values is that each member expressing trust may have a maximum impact on the generated recommendation, and, likewise on the trust values computed for other members. This constraint may be implemented, for example, by limiting the effects of expressions of trust made by any member in proportion to the number of expressions of trust for that member reflected in network 700. In the example of FIG. 7, three expressions of trust made by node $N_1$ are reflected in network 700. These expressions of trust are captured in the weights $W_1$, $W_2$ and $W_3$. Mathematically, the effect of each of these expressions of trust may be limited by limiting the sum $|W_1|+|W_2|+|W_3|+|W_4|$ to be less than or equal 1 on some other suitable maximum value. One approach to achieving this result is by altering the weights associated with all edges leaving a node by scaling them in proportion to the sum of the absolute values of all the edges leaving the node. For edges $E_1$, $E_2$, $E_3$ and $E_4$, the weight of each edge may be changed to equal the initial weighting divided by the sum $|W_1|+|W_2|+|W_3|+|W_4|$. For example, the weight of edge $E_1$ may be set equal to $W_1$ divided by $|W_1|+|W_2|+|W_3|+|W_4|$.

As an example of another constraint, if a node expresses more than one opinion, each opinion may be similarly weighted such that the total effect of opinions expressed by any node is limited. For example, if node $N_7$ expresses opinions about multiple restaurants, the value of each opinion may be scaled by the total number of opinions. For example, if a favorable opinion is nominally represented as a value of +1, if a node expresses two opinions, each favorable opinion may be represented by a value of +½ and each unfavorable opinion may be expressed as −½. Accordingly, other constraints may be imposed by altering the values used to represent node's weights for edges or opinions in a network such as is illustrated in FIG. 7. In this way, iterative processing based on the data set represented by network 700 may lead first to computation of trust values, which then may be used to produce a recommendation.

The recommendation may be produced from the trust values and opinions associated with nodes in the network in any suitable way. In embodiments in which opinions may take two values, such as approve or disapprove, a sum of trust values may be separately computed for nodes expressing a favorable opinion and nodes expressing an unfavorable opinion. The opinion for which the highest sum of trust values is computed may be reported as the recommendation. In embodiments in which there are more than two possible values of an opinion, a similar computation may be performed, with a separate sum combining trust values associated with nodes expressing an opinion having each of the possible values. Though, it should be recognized that other approaches may be employed to translate trust values and opinions into a recommendation such that the result is influenced, or "weighted," by the trust values. For example, each of the opinions may be treated as a vote in favor of expressing a particular option as the recommendation. Accordingly, another option is for the opinion expressed at the largest number of nodes having a trust value above some pre-determined minimum level of trust to be selected as the recommendation. In embodiments in which the opinions expressed may take on a continuous range of values, the recommendation may be determined by taking a weighted average of the individual expressions, with the weight of each opinion being based on the computed value of trust for the node with which that opinion is associated.

Though network 700 is illustrated in the context of a social network generating a personalized recommendation for a member, FIG. 7 may be generally regarded as an illustration of a voting network. Accordingly, the constructs described in conjunction with FIG. 7 for generating personalized recommendations may be used in other scenarios.

In other scenarios, each node may represent an entity of any suitable type. For example, rather than representing members of a social network, each node may represent a web page.

Likewise, in other scenarios, expressions of trust may have other connotations. For example, the connection with a social network, trust was expressed based upon agreement or disagreement with opinions. In other scenarios, an expression of trust could be taken as an assessment of the veracity of a person expressing an opinion. Though, it should be appreciated that trust, as that term is broadly used herein, is not necessarily limited to a human characteristic. In some scenarios, trust may be expressed in computers or other machines. In such a scenario, an expression of trust may reflect an assessment of correct operation of a device.

Similarly, opinions need not be limited to expressions of subjective assessments made by individuals. For example, an opinion may reflect agreement with a stated fact or may reflect a conclusion that a web page satisfies search criteria or that the output of a device represents a correct solution to a problem some or all of these "opinions" may be based on observations, heuristics or criteria other than subjective judgment. Therefore, it should be recognized that the techniques described in conjunction with the voting network depicted in FIG. 7 may be applied in multiple other context regardless of what each node, each expression of trust and each opinion represents.

Figure 8:
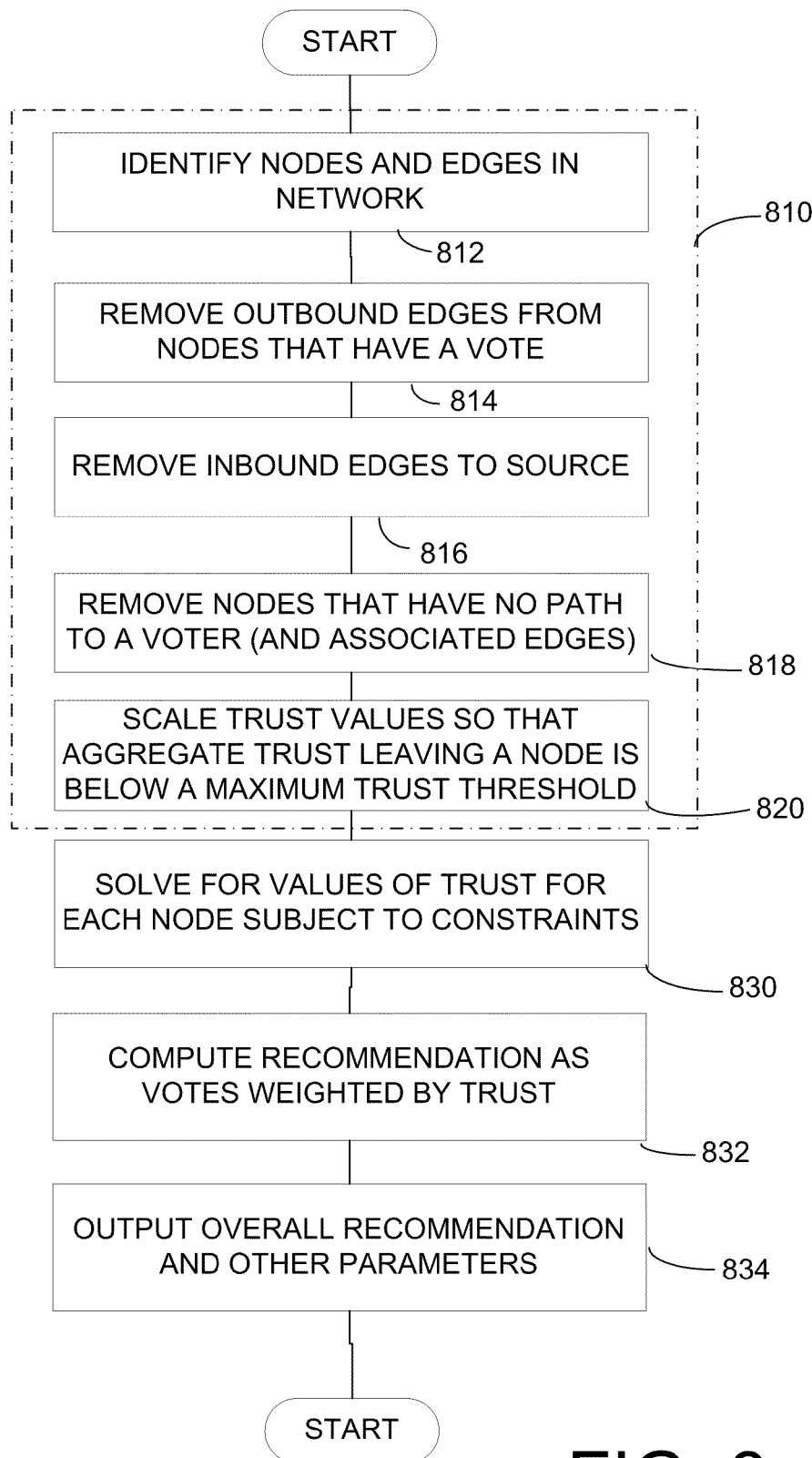
FIG. 8 is a flow chart of a process of generating a personalized recommendation.

Turning to FIG. 8, a method of computing a recommendation is illustrated. The method of FIG. 8 may be used in any scenario in which a data set can be characterized as a voting network. Processing illustrated in FIG. 8 may be performed in any suitable computing device, including server 150 (FIG. 1).

The process of FIG. 8 begins with a subprocess 810 when a network is formed. At block 812, nodes and edges in the network are identified. The processing at block 812 may be performed in any suitable way, which may depend on the scenario in which the technique is applied. In connection with a personal recommendation system attached to a social network, processing at block 812 may involve identifying other members that are linked directly or indirectly to a member requesting a personal recommendation based on member-to-member expressions of trust. Additionally, edges in the network may be identified. In the scenario in which a personalized recommendation is generated for a member of a social network, identifying edges may entail identifying expressions of member-to-member trust. In embodiments in which member-to-member trust is tracked separately for different types of opinions, processing at block 812 may involve identifying expressions of trust in the category relevant to the category about which a member has requested a personal recommendation. In other settings, other techniques may be employed to identify nodes and edges.

Regardless of how the nodes and edges are identified, the set of data to be processed may be reduced by eliminating nodes and edges that do not or should not effect the overall recommendation. Such simplification may be treated as option processing steps. Nonetheless, at block 814, edges may be removed from the network if they are outbound from a node that has an associated vote. Removing these outbound edges reflects a conclusion that fewer levels of indirection result in more accurate information. In the example of FIG. 7, node $N_6$ expresses an opinion $O_6$. The value of that opinion is weighted by the amount of trust that node $N_1$ places in node $N_4$ and further by the level of trust that node $N_4$ places in node $N_6$. Though, if Node $N_4$ had directly expressed an opinion, it may be regarded as more reliable and therefore have a greater influence on an overall recommendation than the opinion expressed by node $N_6$. Accordingly, if node $N_4$ had expressed an opinion, edge $E_7$ may be removed from the network, effectively removing consideration of the opinion $O_6$ expressed at node $N_6$. Though, it should be appreciated that a similar effect may be achieved by reducing weight $W_7$ and leaving edge $E_7$ in network 700.

Another simplification that may be made at block 816 is to remove inbound edges to the source. In the example of FIG. 7, node $N_1$ is the source. In some embodiments, the source may be assigned a trust $t_1$ that has a predefined value. In the example above, the trust of node $N_1$ is assigned a value of 1. If the value of trust at node N1 were altered in computing consistent values of trust throughout the network, that change would propagate through the network, affecting trust computed for other nodes in a proportional fashion. Such proportional changes would not alter ratios between trusts of various nodes that therefore may not impact the relative ordering of weighted averages of opinions. Therefore, any inbound edges to the source node may not impact the ultimate recommendation, but may increase computation time. Therefore, processing at block 816 may remove those inbound edges in some embodiments.

Further simplification may be made at block 818. At block 818, nodes that have no path to a node that has registered a vote may be removed.

Another preprocessing step may be performed at block 820. At block 820, trust values associated with nodes having multiple outbound edges may be scaled such that the aggregate trust leaving any node is below a maximum trust threshold. As an example, the maximum trust threshold may be set to a value, such as 1. If the sum of the absolute values of the weights on all of the edges leaving any node exceeds that maximum trust threshold, each of the weights may be scaled in proportion to the amount that the sum of the absolute values exceeds the maximum trust threshold. Though, any suitable mathematical manipulation may be used to limit the aggregate effect of trust expressed by any node.

Once the preprocessing is completed, a solution for trust values at each of the remaining nodes in the network may be computed at block 830.

Processing at block 830 may use linear algebraic techniques to compute a value of trust for each node. These techniques may take into consideration the different paths that may be traced through the network, such that positive levels of trust can reinforce trust in a node, but negative levels of trust by some may cancel out positive levels of trust by others. These techniques may include constraints or other conditions as discussed above.

As a specific example, a solution may be obtained as follows: For all of nodes in the network remaining after preprocessing 810, solve for $x_u$ according to EQ. (1)

$$x_u = 1 + \sum_v |w_{uv}| x_v \qquad \text{EQ. (1)}$$

where u and v represent nodes in the voting network and $w_{uv}$ represents a node-to-node expression of trust from node u to node v.

The computed values of $x_u$ for all of the nodes in the network may then be used to compute values of trust, t, for each of the nodes by finding values of trust that minimize, or at least reduce to an acceptably small level, the value of EQ. (2):

$$\sum_u x_u \left( t_u - \sum_v \omega_{vu} t_v \right) \qquad \text{EQ. (2)}$$

That minimization may be subject to the following constraints:

$t_s = 1$ $t_u \geq 0$ for all $u \in N$ $t_u - \sum_v \omega_{vu} t_v \geq 0$ for all $u \in N$ Here, $w_{vu}$ represents a node-to-node expression of trust from node v to node u. N represents the voting network being processed, and $t_s$ represents trust at the source node.

Linear algebraic techniques are known in the art for solving equations, such as EQ. (1) and EQ. (2). Any suitable technique may be employed, including numeric techniques that result in iterative computation of a consistent solution.

Regardless of the manner in which values of trust are computed at block 830, the process may proceed to block 832. At block 832, a recommendation may be computed based on votes weighted by the computed trust values. Any suitable computation may be performed at block 832, and the specific processing may depend on the nature of votes within the network. In an embodiment in which votes may take on one of a number of discrete values, processing at block 832 may entail separately summing the trust values for nodes expressing votes corresponding to each of the possible discrete values. The discrete value associated with the highest sum may be the overall recommendation. Though other techniques for generating a recommendation may be used. As an example of one variation, the recommendation may be selected based on the vote associated with the node that has the highest trust value.

Regardless of the manner in which a recommendation is selected based on trust values, the process may proceed to block 834 where the overall recommendation may be output. In an embodiment in which the recommendation is a personalized recommendation computed over a social network, outputting a recommendation may entail rendering a display on a user's computing device. However, any suitable output mechanism may be used.

Alternatively or additionally, other parameters may be output. In a scenario in which votes take on one of multiple discrete values, the sum of the trust values for nodes voting for each of the discrete values may also be output. This information may be a reflection of the closeness of the "vote." In embodiments in which the recommendation is weighted average of values in a range, analogous information may be expressed as a variance. Such information may be used as an indicator of certainty or reliability or for other purposes.

Figure 9A:
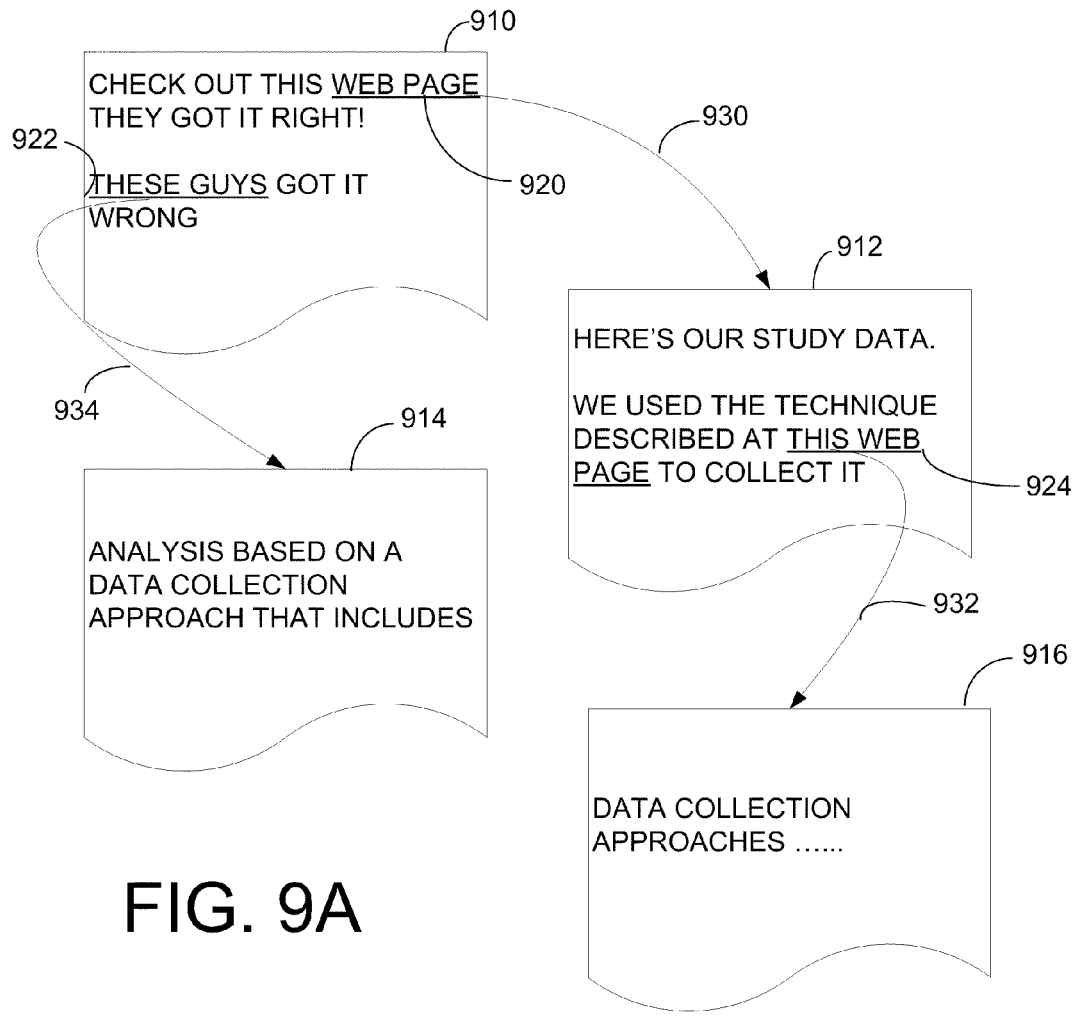
FIG. 9A is a conceptual illustration of positive and negative links between web pages.

FIG. 9A illustrates an example of another scenario in which processing, such as that illustrated in FIG. 8, may be employed. FIG. 9A conceptually illustrates blocks of information that may be accessible over a network. In this example, the blocks of information are described as web pages and may be accessed over a network, such as the Internet. FIG. 9A shows web pages 910, 912, 914 and 916. It should be appreciated that FIG. 9A is a simplified example of information that may be accessed over a network and that in some embodiments, many more than four web pages will be present.

Some of the web pages depicted in FIG. 9A include links to other web pages. For example, web page 910 includes a link 920 to web page 912. Web page also includes a link 922 to web page 914. Web page 912 includes a link 924 to web page 916.

Some of the links depicted in FIG. 9A may be regarded as positive links. Others of the links may be regarded as negative links. For example, link 920 and 924 may be regarded as positive links. In contrast, link 922 may be regarded as a negative link. The classification of links may be implemented by the developer of each web page containing a link. Though, it should be recognized that links may be classified in other ways, such as by a computer-based analysis of the context in which the link appears. For example, web page 910 contains text surrounding link 920 that may provide context for the link. In the simplified example, the text contains words, such as "right," that suggest that link 920 is a positive link. Conversely, the text surrounding link 922 contains words, such as "wrong," that indicate that link 922 is a negative link.

The characterization of the links as positive or negative may be taken as an expression of trust from one web page to another. Accordingly, the links may be regarded as edges in a voting network. FIG. 9A depicts edges 930, 932 and 934. The expressions of trust may be taken as weights for these edges. For example, edge 930 may be assigned a weighting of +1, indicating a positive expression of trust. Similarly, edge 932 may be assigned a weight of +1. Conversely, edge 934 may be assigned a weight of −1, representing a negative expression of trust.

These expressions of trust may be used to produce a recommendation for useful web pages identified by a search engine by modeling the information represented in FIG. 9A as a voting network and then applying a technique as illustrated in FIG. 8. Specifically, a search engine may identify multiple pages matching search criteria. A computed level of trust in a matching web page may be used in filtering or ordering the web pages matching the search criteria. As a specific example, a search query processed by a search engine may contain a phrase such as "data collection." Such a search query may match both web pages 914 and 916. By representing the information in FIG. 9A as a voting network with the search engine's selection of web page 914 taken as a vote that web page 914 meets the search criteria and the search engine's identification of web page 916 taken as a vote that web page 916 meets the search criteria.

Figure 9B:
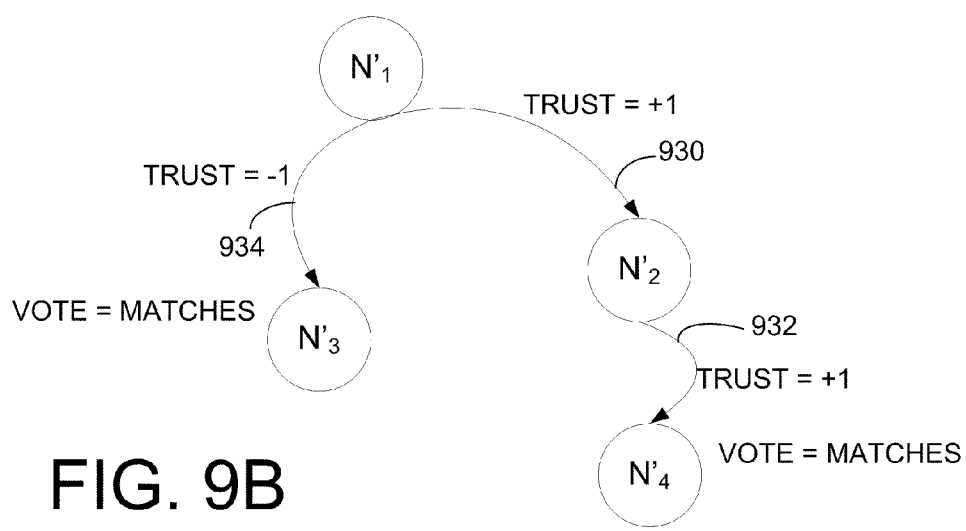
FIG. 9B is a sketch of a network of nodes and edges representing the web pages of FIG. 9A.

FIG. 9B illustrates the manner in which the information depicted in FIG. 9A can be recast as a voting network similar to that in FIG. 7. Each of the web pages is represented as a node. For example, node $N'_1$ may represent web page 910. Node $N'_2$ may represent web page 912. Node $N'_3$ may represent web page 914, and Node $N'_4$ may represent web page 916. Edges 930, 932 and 934 represent the links between web pages, may likewise be represented in the voting network depicted in FIG. 9B. Nodes $N'_3$ and $N'_4$ are shown having votes associated with them because the web pages associated with those nodes have been selected by the search engine as matching the search criteria. Techniques as described above may be used to propagate the trust values associated with each of the edges 930, 932 and 934 to compute values of trust associated with each of the nodes.

The values of trust associated with nodes having a "vote" may be used to weight the respective votes associated with those nodes, which may then be used to filter or rank the web pages to be returned by the search engine. For example, the matching web page with the highest computed trust may be ranked highest. Alternatively, all matching web pages with a trust above some threshold may be returned, or matching web pages may be ordered based on trust when presented to a user. In embodiments in which a search engine computes a score representing a degree of similarity to a search query, web pages may be selected based on the score weighted by the valve of trust.

Though FIG. 9B is a simple example derived from the simple dataset illustrated in FIG. 9A, an approach of propagating trust to generate values used to filter or rank results may be particularly useful if a large number of web pages are present and a search query generates a large number of matching web pages.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other non-transitory, tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method comprising:
   with at least one processor:
   adding a first friend to a user's network of friends in a social network;
   receiving a first rating from the first friend regarding a first product or service;
   receiving a first indication from the user that the user agrees with the first friend's rating of the first product or service;
   adding a second friend to the user's network of friends;
   receiving a second rating from the second friend regarding a second product or service;
   receiving a second indication from the user that the user disagrees with the second friend's rating of the product or service;
   computing a trust value for each of the first friend and the second friend based on trust values associated with each of the first friend and the second friend in the social network;
   creating a data set representing the first friend as a first node and the second friend as a second node and connections between the first node, the second node, and the user as a plurality of directional edges, each having an associated value for an expression of trust, wherein:
   a first directional edge of the plurality of directional edges represents the connection between the first node and the user and has a positive expression of trust based on the first indication from the user that the user agrees with the first friend's rating of the first product or service,
   a second directional edge of the plurality of directional edges represents the connection between the second node and the user and has a negative expression of trust based on the second indication from the user that the user disagrees with the second friend's rating of the second product or service, and,
   the computed trust value for each of the first friend and the second friend being greater than a threshold associated with a minimum level of trust in the social network;
   transmitting, to the user, a recommendation for a third product or service based on the positive expression of trust associated with the first friend and information that the first friend rated the third product or service positively.

2. The method of claim 1, wherein the computing comprises minimizing an equation subject to constraints.

3. The method of claim 2, wherein the equation comprises $$\sum_u x_u \left( t_u - \sum_v \omega_{vu} t_v \right)$$

in which:

$$x_u = 1 + \Sigma_u |w_{uv}| x_v$$

where u represents the first friend and v represents the second friend in the social network, and $w_{vu}$ indicates a trust expressing a trust of the second friend v in the first friend u.

4. The method of claim 3, wherein the constraints comprise:

$$t_u - \sum_v \omega_{vu} t_v \geq 0$$

where $t_u$ and $t_v$ are the trust values for friends u and v, respectively.

5. The method of claim 1, wherein the minimum level of trust in the social network correlates with no trust, whereby friends that are distrusted do not impact computation of trust of other friends.

6. The method of claim 1, wherein the data set comprises information defining a plurality of friends in the social network in which at least a first portion of the plurality of friends have expressed trust in at least a second portion of the plurality of friends, each friend of the plurality of friends being represented as a node of the plurality of nodes and each expression of trust being an associated trust for a directional edge of the plurality of directional edges.

7. The method of claim 6, further comprising producing a recommendation based on ratings expressed by a third portion of the plurality of friends, the producing comprising forming a weighted combination of values representing the ratings, the weighted combination comprising a combination of each of the values representing a rating weighted by the value of trust computed for a node of the plurality of nodes representing the friend that expressed the ratings.

8. The method of claim 1, wherein the data set comprises information defining a plurality of web pages accessible over a network in which at least a first portion of the plurality of web pages have links to at least a second portion of the plurality of web pages, each web page of the plurality of web pages being represented as a node of the plurality of nodes and each link defining an associated trust value for an edge.

9. A non-transitory computer-readable medium having instructions recorded thereon for transmitting a recommendation, the instructions comprising:
instructions for adding a first friend to a user's network of friends in a social network;
instructions for receiving a first rating from the first friend regarding a first product or service;
instructions for receiving a first indication from the user that the user agrees with the first friend's rating of the first product or service;
instructions for adding a second friend to the user's network of friends;
instructions for receiving a second rating from the second friend regarding a second product or service;
instructions for receiving a second indication from the user that the user disagrees with the second friend's rating of the product or service;
instructions for computing a trust values for each of the first friend and the second friend based on trust values associated with each of the first friend and the second friend in the social network;
instructions for creating a data set representing the first friend as a first node and the second friend as a second node and connections between the first node, the second node, and the user as a plurality of directional edges, each having an associated expression of trust value, wherein:
a first directional edge of the plurality of directional edges represents the connection between the first node and the user and has a positive expression of trust value based on the first indication from the user that the user agrees with the first friend's rating of the first product or service,
a second directional edge of the plurality of directional edges; represents the connection between the second node and the user and has a negative expression of trust value based on the second indication from the user that the user disagrees with the second friend's rating of the second product or service, and,
the computed trust values for each of the first friend and the second friend being greater than or equal to a threshold associated with a minimum level of trust in the social network; and
instructions for transmitting, to the user, a recommendation for a third product or service based on the positive expression of trust associated with the friend and information that the first friend rated the third product or service positively.

10. The non-transitory computer-readable medium of claim 9, wherein the non-transitory computer-readable medium further comprises instructions for computing associated expression of trust values for directional edges of the plurality of directional edges, the computing comprising, for nodes having a plurality of leaving edges leaving the node, scaling initial expression of trust values for each leaving directional edge based on a combined value of the initial expression of trust values for leaving directional edges for the node.

11. The non-transitory computer-readable medium of claim 9, wherein the non-transitory computer-readable medium further comprises instructions for receiving input from the user's friends in the social network, the input representing ratings of a plurality of products and services and expressing trust in friends of the social network to provide a rating.

12. The non-transitory computer-readable medium of claim 11, wherein the non-transitory computer-readable medium further comprises:
instructions for receiving user input representing a request for a recommendation for a product or service;
instructions for forming the data set based on information stored for selected friends of the social network, the selected friends comprising friends that expressed a rating of a product or service and friends that expressed a level of trust in the friends that expressed a rating of a product or service.

13. The non-transitory computer-readable medium of claim 9, wherein the minimum level of trust is a value indicating zero trust.

14. The non-transitory computer-readable medium of claim 9, wherein:

the data set comprises information defining a plurality of web pages accessible over a network in which at least a first portion of the plurality of web pages have links to at least a second portion of the plurality of web pages, each web page of the plurality of web pages being represented as a node of the plurality of nodes and each link defining an associated expression of trust value for an edge; and the instructions further comprise:

instructions for collecting associated expression of trust values for the data set, each trust value having a value based on a nature of a link between two web pages.

15. The non-transitory computer-readable medium of claim 14, wherein instructions for collecting associated trust values comprise assigning a negative trust value for a link classified in the web page containing the link as a negative link.

16. A computerized system implementing a social network, the computerized system comprising:

at least one processor configured to:

add a first friend to a user's network of friends in a social network;

receive a first rating from the first friend regarding a first product or service;

receive a first indication from the user that the user agrees with a first friend's rating of the product or service;

add a second friend to the user's network of friends;

receive a second rating from the second friend regarding a second product or service;

receive a second indication from the user that the user disagrees with the second friend's rating of the product or service;

compute a value of trust for each of the first friend and the second friend based on trust values associated with each of the first friend and the second friend in the social network;

create a data set representing the first friend as a first node and the second friend as a second node and connections between the first node, the second node, and the user as a plurality of directional edges, each having an associated value for an expression of trust, wherein:

a first directional edge of the plurality of directional edges represents the connection between the first node and the user and has a positive expression of trust based on the first indication from the user that the user agrees with the first friend's rating of the first product or service, a second directional of the plurality of directional edges represents the connection between the second node and the user and has a negative expression of trust based on the second indication from the user that the user disagrees with the second friend's rating of the second product or service, and, the computed trust value for each of the first friend and the second friend being above a threshold associated with a minimum level of trust in the social network;

transmit, to the user, a recommendation for a third product or service based on the positive expressions of trust associated with the first friend and information that the first friend rated the third product or service positively.

17. The computerized system of claim 16, further configured to receive and store a plurality of ratings from friends of a plurality of friends relating to a plurality of products and services.

18. The computerized system of claim 17, further configured to:

present a rating of the plurality of ratings to the user, the rating having been made by a friend;

receive input from the user indicating a level of agreement with the presented rating; and store a value indicating an expression of trust between the user and the friend based on the input indicating the level of agreement.

19. The computerized system of claim 16, wherein the threshold corresponds to zero trust.

20. The computerized system of claim 16, further configured to compute a value for an expression of trust of a first friend in a second friend based on scaling an expression of trust value assigned by the first friend to the second friend, the trust value being scaled in proportion to the total amount of trust values assigned by the first friend to friends of the plurality of friends.

* * * * *